US008928755B2

(12) United States Patent
Kotani

(10) Patent No.: US 8,928,755 B2
(45) Date of Patent: Jan. 6, 2015

(54) INFORMATION PROCESSING APPARATUS AND METHOD

(75) Inventor: Takuya Kotani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 562 days.

(21) Appl. No.: 12/911,616

(22) Filed: Oct. 25, 2010

(65) Prior Publication Data
US 2011/0102596 A1 May 5, 2011

(30) Foreign Application Priority Data

Oct. 30, 2009 (WO) .................. PCT/JP2009/068661

(51) Int. Cl.
H04N 7/18 (2006.01)
H04N 13/00 (2006.01)
H04N 13/02 (2006.01)
G08B 13/196 (2006.01)
G06T 7/00 (2006.01)

(52) U.S. Cl.
CPC ....... *H04N 13/0048* (2013.01); *H04N 13/0203* (2013.01); *H04N 13/0062* (2013.01); *G08B 13/19645* (2013.01); *H04N 7/181* (2013.01); *H04N 13/0051* (2013.01); *G06T 7/0065* (2013.01); *H04N 13/0011* (2013.01)
USPC ................. 348/159; 348/42; 348/43; 348/46; 348/47; 348/48

(58) Field of Classification Search
USPC .................................. 348/159, 42, 43, 46–48
See application file for complete search history.

(56) References Cited

U.S. PATENT DOCUMENTS 5,175,616 A * 12/1992 Milgram et al. ................. 348/47
2004/0247175 A1 12/2004 Takano

FOREIGN PATENT DOCUMENTS

| CN | 001678084 A | 10/2005 | |
|----|----|----|----|
| CN | 101426093 A | 5/2009 | |
| JP | 09-179984 A | 7/1997 | |
| JP | 2000-307947 A | 11/2000 | |
| JP | 3561446 B2 | 9/2004 | |
| JP | 2005-149127 A | 6/2005 | |
| JP | 2006-352539 A | 12/2006 | |
| WO | WO 9847294 A1 * | 10/1998 | ............. H04N 13/00 |

* cited by examiner

Primary Examiner — Geepy Pe
(74) Attorney, Agent, or Firm — Canon USA, Inc. IP Division

(57) ABSTRACT

An apparatus includes a setting unit for setting a virtual viewpoint; a determining unit for determining an undefined area in which an object distance cannot be defined in a virtual image of the virtual viewpoint, from image data of a plurality of images photographed by a plurality of photographing units placed at different positions; a correction setting unit for setting an amount of correction of a position of at least one of the photographing units from the undefined area; and a generating unit for generating the image of the virtual viewpoint from image data of a plurality of images photographed by the plurality of photographing units placed at positions that are corrected in accordance with the amount of correction.

9 Claims, 16 Drawing Sheets

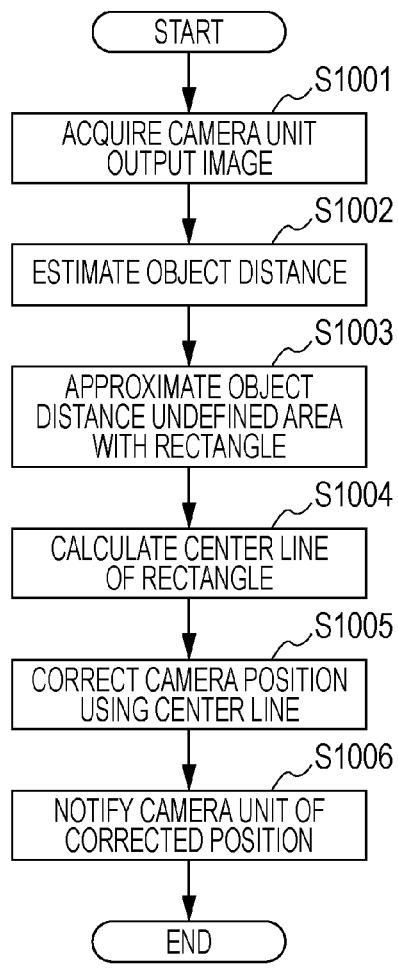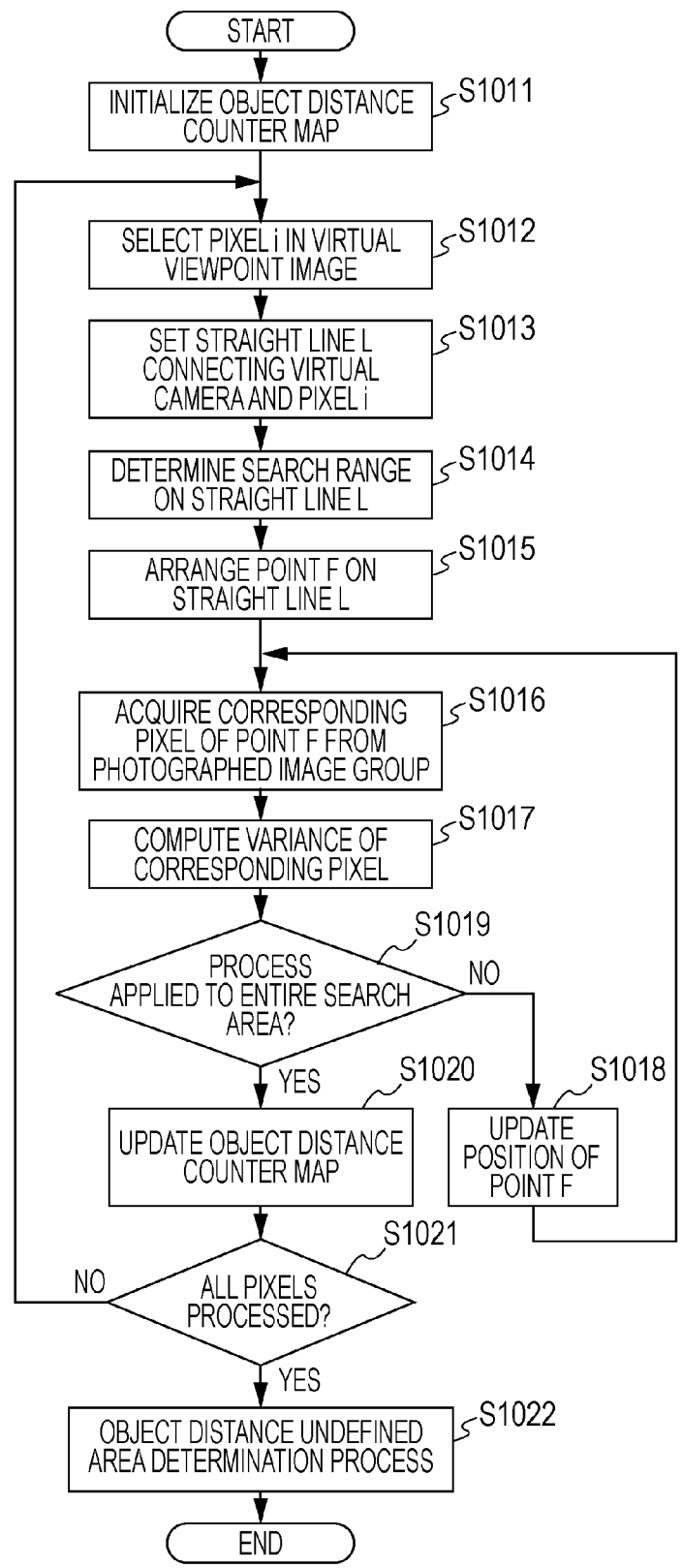

INFORMATION PROCESSING APPARATUS AND METHOD

TECHNICAL FIELD

The present invention relates to generation of a virtual viewpoint image from multiple-viewpoint images.

BACKGROUND ART

Known methods for obtaining an image (virtual viewpoint image) of a viewpoint different from a photographing position include tilt-shift shooting for shooting images with the optical axis moving, and a method for obtaining a free-viewpoint image by generating a distance map and combining a plurality of images of different viewpoints (multiple-viewpoint images) in accordance with the distance map. Known methods for obtaining multiple-viewpoint images include a method in which, as in Japanese Patent Laid-Open No. 2000-307947, an object is photographed a plurality of times in such a manner that areas including the object can overlap one another and resulting images are combined, and a method in which, as in Japanese Patent Laid-Open No. 2006-352539, a camera array is used. The latter is superior in terms of hand-held shooting or the like.

Photographic systems for obtaining multi-viewpoint images using a camera array include a system in which, as in Japanese Patent Laid-Open No. 2006-352539, an object is photographed from all directions, and a system in which, as in ProFUSION25, which is manufactured by ViewPLUS Inc., images are photographed by a plurality of cameras arranged in a plane. In order to obtain an image of a viewpoint different from a photographing position, it is very important to acquire a distance map of a photographing area including an object. The arrangement of cameras forming a camera array greatly affects the accuracy of the distance map. As in Japanese Patent No. 3561446, a method in which cameras are arranged in front of and behind the optical axis has been proposed. Known methods for generating a distance map from multiple-viewpoint images include, for example, a plane sweep method.

Conventionally, cameras forming a camera array are arranged in a regular pattern such as a grid, a radial pattern, or a hemisphere. If cameras are arranged in a regular pattern, a problem occurs in that distance information about a single-color object having a size to some extent cannot be correctly acquired.

For example, as in FIG. 5A, it is assumed that a single-color bar X (for example, a handrail), which is a single-color object, is arranged parallel to the arrangement of a plurality of cameras. Images photographed by cameras A, B, and C are as illustrated in, for example, FIG. 5B. In FIG. 5B, black line portions correspond to image portions of the single-color object X in the respective images. In FIG. 5B, a, b, and c represent positions on an image corresponding to real-space positions (virtual object positions) a, b, and c illustrated in FIG. 5A.

As illustrated in FIGS. 5A and 5B, the pixel values in the images of the respective cameras corresponding to the positions a, b, and c are the same because the object X has a single color. Therefore, the pixel corresponding to the position b at which the single-color object X is located cannot be specified from the images of the respective cameras. Accordingly, the position b of the object X (object position) cannot be narrowed down to one point.

As illustrated in FIG. 5C, when an object having substantially uniform feature values is located in a plane that includes a straight line passing through two cameras, feature values substantially match at a plurality of virtual object positions. Thus, in principle, the object position cannot be specified using only two cameras. Therefore, it is necessary to add a further camera to narrow down virtual object positions. However, as described above, if another camera is added on the straight line passing through the two cameras, the object position cannot be specified. Thus, it is not effective to add a camera at such a position. Due to the physical constraint on the number of cameras arranged in a camera array, reducing as much as possible the number of cameras that do not contribute to an increase in the amount of information largely contributes to the production of a correct result of three-dimensional estimation and therefore the production of a high-quality virtual viewpoint image.

The present invention has been made to solve the above problem, and it is an object of the present invention to obtain a desired virtual viewpoint image or distance map by optimizing the position of an image capture unit.

SUMMARY OF INVENTION

According an aspect of the present invention, an apparatus that generates an image of a virtual viewpoint from images captured using a plurality of capture units placed at different positions, the virtual viewpoint being different from positions at which the capture units are placed, the apparatus including a viewpoint setting unit configured to set the virtual viewpoint; a determining unit configured to determine an undefined area in which an object distance cannot be defined in the image of the virtual viewpoint, from image data of a plurality of images captured by a plurality of capture units; a correction setting unit configured to set an amount of correction of a position of at least one of the capture units from the undefined area; and a generating unit configured to generate the image of the virtual viewpoint from image data of the plurality of images that are corrected in accordance with the amount of correction.

According another aspect of the present invention, there is provided an apparatus that generates a distance map of a virtual viewpoint from images captured using a plurality of capture units placed at different positions, the virtual viewpoint being different from positions at which the capture units are placed, the apparatus including a virtual viewpoint setting unit configured to set a virtual viewpoint; a determining unit configured to determine an undefined area in which an object distance cannot be defined in the image of the virtual viewpoint, from image data of a plurality of images captured by a plurality of capture units; a correction setting unit configured to set an amount of correction of a position of at least one of the capture units from the undefined area; and a generating unit configured to generate a distance map of the virtual viewpoint from image data of the plurality of images that are corrected in accordance with the amount of correction.

Further features of the present invention will become apparent from the following description of exemplary embodiments with reference to the attached drawings.

BRIEF DESCRIPTION OF DRAWINGS

FIGS. 10A and 10B are flowcharts illustrating a flow of a camera position correction process.

DESCRIPTION OF EMBODIMENTS

Exemplary Embodiment 1

In Exemplary Embodiment 1, the positions of camera units forming a camera array are dynamically corrected. The camera array is formed of two or more cameras. In this exemplary embodiment, cameras forming a camera array are referred to as "camera units" to clearly distinguish between a multi-lens digital camera and cameras forming a camera array.

Figure 1A:
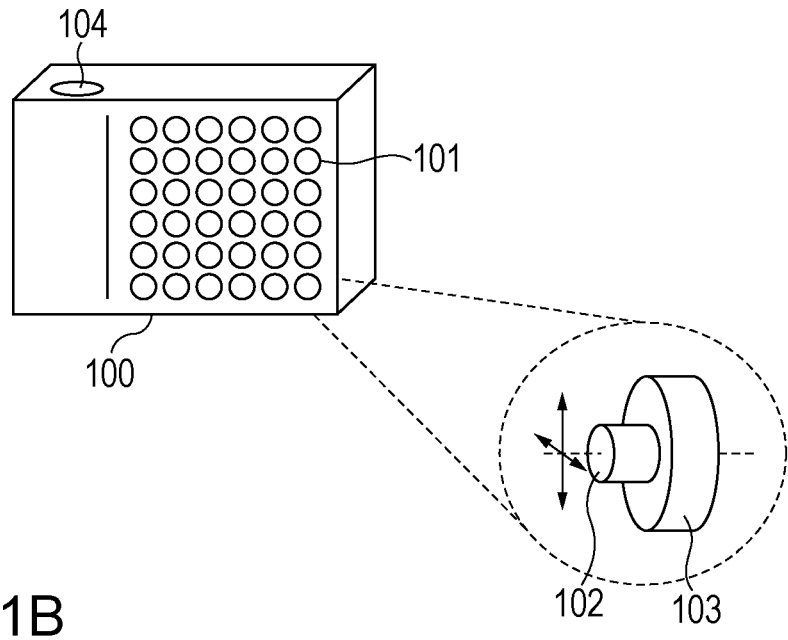
FIGS. 1A to 1D are diagrams illustrating an external appearance of a photographing device according to Exemplary Embodiment 1.
Figure 1B:
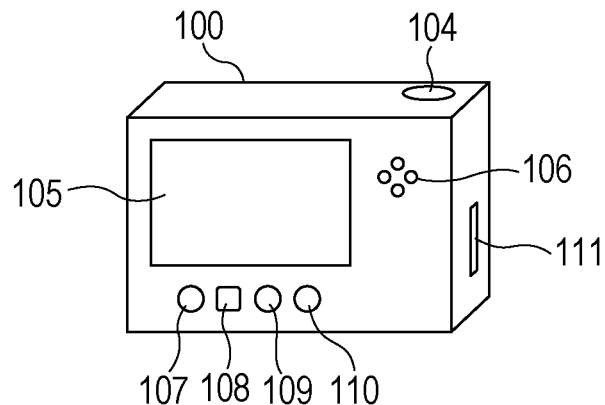
Figure 1C:
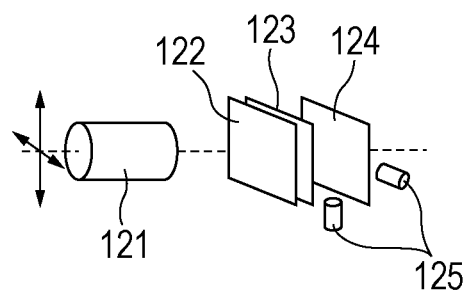

FIGS. 1A to 1C are perspective views illustrating an overview of a multi-lens digital camera according to this exemplary embodiment. FIGS. 1A and 1B illustrate overviews of a front view and a rear view, respectively. A camera array in which camera units 101 are arranged in a grid is provided on a front surface of a multi-lens digital camera body 100, and a plurality of viewpoint images can be simultaneously obtained using the plurality of camera units. A release button 104 for instructing start of photographing is provided in an upper portion of the multi-lens digital camera body 100.

Each of the camera units 101 forming the camera array includes an image capture device 102, a retaining ring 103, and actuators 125, and the actuators allow the image capture device 102 to move horizontally and vertically within the range of the retaining ring 103. In this exemplary embodiment, the image capture device 102 is configured by integrating a lens 121, an LPF 122, an imaging sensor (for example, a CCD sensor) 123, a horizontal/vertical drive stage 124, and a peripheral circuit (not illustrated). This image capture device is driven horizontally and vertically by using the actuators 125 used for driving (FIG. 1C).

Figure 1D:
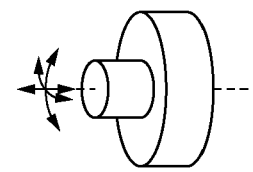

In this exemplary embodiment, the image capture device 102 is driven horizontally and vertically. In addition to driving in the horizontal and vertical directions, for example, forward and backward driving in the optical axis direction or rotating may also be done (FIG. 1D). However, rotation of a camera unit about the center of an imaging element does not solve the problem that an object distance cannot be specified. The amount of movement of each of the camera units 101 is held, and is transmitted by being added to an image when photographed image data is transferred to a buffer memory 208 (see FIG. 2).

A card slot 111 into which an external recording medium (for example, a semiconductor memory card) is inserted is provided in a side surface of the multi-lens digital camera body 100. An image display device 105, cross switches 106, a power button 107, a menu button 108, a set button 109, and a cancel button 110 are provided on a rear surface of the multi-lens digital camera body 100. In this exemplary embodiment, since an optical viewfinder is not provided, the image display device 105 is used to check focus and composition. The image display device 105 provides live view display for allowing real-time display of a photographic range, and also provides display of a camera setting menu when the menu button 108 is pressed. When the menu button 108 is pressed during display of the camera setting menu, the state is returned to the live view state.

In the camera setting menu displayed by the menu button 108, first, an item is selected, and the state of the selected item is changed using the set button 109 or the state is returned to the selection of an item using the cancel button 110 without any change. Items that can be changed in the camera setting menu include specifying an aperture value, a camera shutter speed, a virtual camera viewpoint, an output image format, and an image data format.

In this exemplary embodiment, the aperture values or the shutter speeds of camera units forming a camera array are set to the same value. The aperture values or the shutter speeds of camera units may also be set individually. While the same setting for the respective camera units allows photographic conditions to be set in an operational way similar to that with conventional digital cameras, individual settings for the camera units allow a more accurate virtual viewpoint image to be obtained.

Virtual camera viewpoint information includes information about the position, posture, angle of view, and photographing distance of the virtual camera. The photographing distance is a distance from the virtual camera viewpoint to the virtual focus plane, and is different from the object distance which is the distance from the virtual camera viewpoint to the object. As with a normal digital camera, the photographing distance is determined by measuring a position in the photographing area, which is specified at the time when the photographing-ready state is set. For example, in the multi-lens digital camera of this exemplary embodiment, the camera unit at the position closest to the AF distance measurement frame is selected, a photographing distance is determined using the selected camera unit, and the determined photographing distance is reported to the other cameras.

Figure 6:
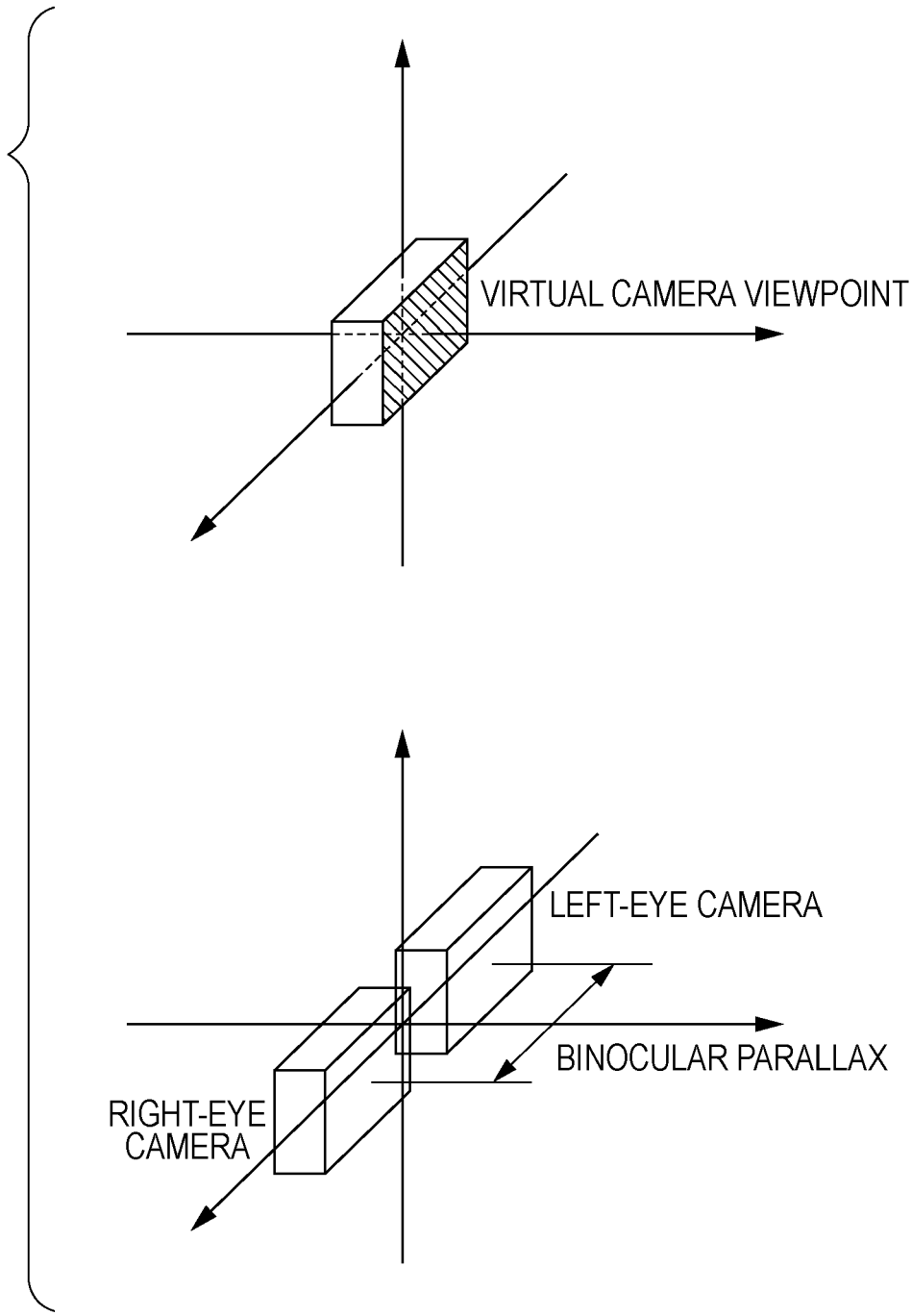
FIG. 6 is a diagram illustrating an overview of a process for determining a virtual camera position when a stereo image is generated.

In this exemplary embodiment, the format of image data generated by the multi-lens digital camera is determined on the basis of an output image format and an image data format. In this exemplary embodiment, four types of output image formats, 2D image, stereo image, multi-parallax image, and RAW image, are selectable. The 2D image is single virtual viewpoint image data representing the video viewed from the virtual camera viewpoint. The stereo image is right-eye viewpoint image data and left-eye viewpoint image data representing a binocular parallax image viewed at the virtual camera viewpoint. As illustrated in FIG. 6, two virtual cameras (a right-eye virtual camera and a left-eye virtual camera) are set in accordance with a binocular parallax (of, for example, 6 cm) with respect to the virtual camera viewpoint, and video viewed from each of the two cameras is output as image data. When two virtual cameras are set, an angle of convergence may also be specified in addition to a binocular parallax. By specifying an angle of convergence, it is possible to obtain a natural-looking stereo image even when the photographing distance is short. In the multi-parallax image, unlike the stereo image, a plurality of pieces of image data are generated in accordance with an arbitrary number of parallaxes that are separately specified, without limiting the number of parallaxes to two in the horizontal direction. The number of parallaxes can be specified independently horizontally and vertically. The RAW image is a format in which image data photographed using each camera unit is recorded without being modified. In the case of this output image format, image data corresponding to each camera unit is stored together with virtual camera viewpoint information about the camera unit. Storage of the outputs (multiple-viewpoint images) of the respective camera units as they are makes it possible to change the depth of field, a viewpoint position, or the like (refocus process) using a PC or the like.

Figure 7:
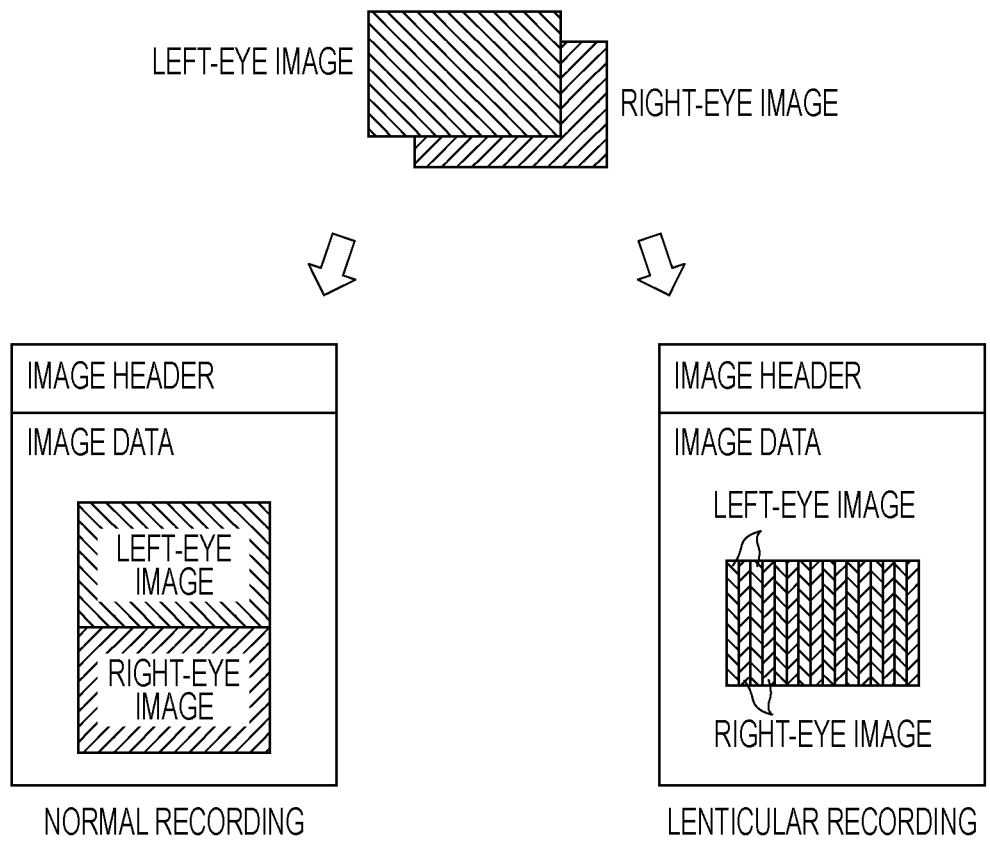
FIG. 7 is a diagram illustrating an overview of an image data format.

An image data format is information for specifying a method of storing image data of a plurality of virtual camera viewpoints, such as the stereo image or the multi-parallax image. In this exemplary embodiment, as an image data format, normal recording in which a plurality of pieces of image data are recorded as they are, or lenticular recording in which a plurality of parallax images are combined in strips or into a grid for lenticular printing/display can be selected (FIG. 7). In the case of lenticular recording, if parallax is specified in only one of the horizontal and vertical directions, a plurality of parallax images are alternately combined in strips. If parallax is set in both directions, a plurality of parallax images are alternately combined into a grid. Lenticular recording, in which parallax can be set independently in the horizontal and vertical directions, can also support integral-type naked-eye stereoscopic monitors.

In this exemplary embodiment, "automatic selection" for recognizing an output device connected to a camera and automatically selecting one of normal recording and lenticular recording is further prepared as an image data format. In a case where "automatic selection" is set as an image data format, at the time when photographing is instructed using the release button 104, a microcomputer 200 executes a process illustrated in FIG. 8, and determines an output image data format. First, it is determined whether or not the multi-lens digital camera body and an output device are connected to each other (step S801). If it is determined that an output device is connected, information about the data format supported by the output device is acquired from the output device (step S802). In accordance with the acquired data format, either normal recording or lenticular recording is set as an image data format. Further, when lenticular recording is set, the number of parallaxes in the horizontal and vertical directions is set on the basis of the acquired data format (step S803). On the other hand, if it is determined in step S801 that no output crisis is connected, a predetermined image data format is set. In this exemplary embodiment, normal recording is set (step S804).

If the RAW image is specified as an output image format, "automatic selection" cannot be selected as an image data format. Then, if the RAW image is selected as an output image format in a state where "automatic selection" is set as an image data format, "normal recording" is automatically set.

Figure 2:
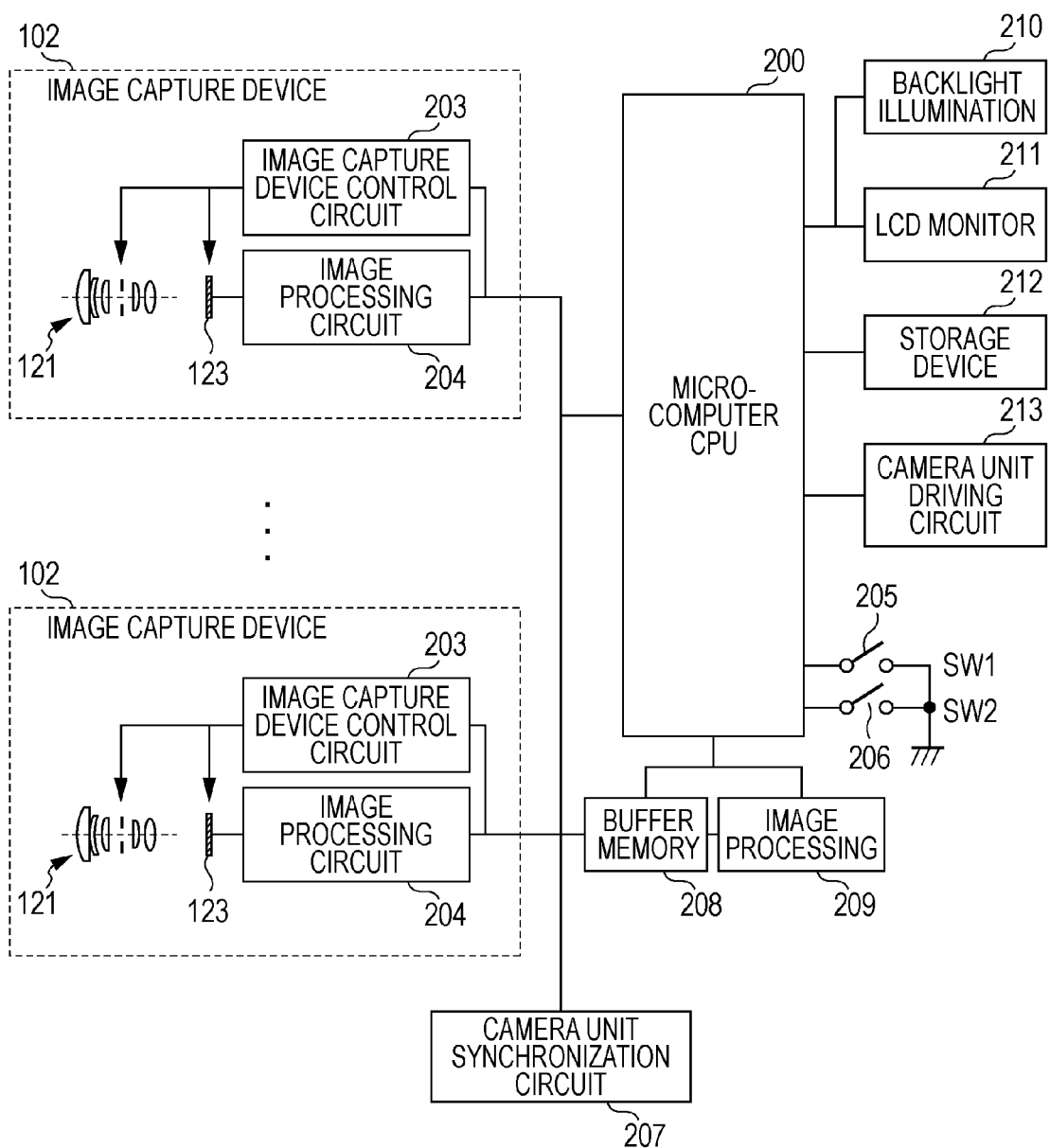
FIG. 2 is a diagram illustrating a detailed configuration of the photographing device.

FIG. 2 is a block diagram illustrating a circuit configuration of a multi-lens digital camera according to this exemplary embodiment. In FIG. 2, the microcomputer 200 controls the overall camera operation including processes for image data output from the image capture devices 102, drive control of the image capture devices 102, and display control of an LCD monitor device 211.

A switch (SW1) 205 is turned on when the release button 104 (see FIGS. 1A and 1B) is half pressed, and when the switch (SW1) 205 is turned on, the multi-lens digital camera of this embodiment enters a photographing-ready state. A switch (SW2) 206 is turned on when the release button 104 is fully pressed (full-press state), and when the switch (SW2) 206 is turned on, the multi-lens digital camera of this embodiment starts a photographing operation. In the multi-lens digital camera according to this embodiment, since the plurality of image capture devices 102 need to be synchronously driven, the driving is controlled using a camera unit synchronization circuit 207.

Each of the image capture devices (camera units) 102 is configured by the photographic lens 121, the imaging sensor 123, an image capture device driving circuit 203, and an image processing circuit 204. The actuators 125 that adjust the position of the image capture device 102 are controlled by a camera unit driving circuit 213. The photographing device control circuit 203 performs lens control, shutter control, and the like. Examples of the lens control include drive control of the photographic lens 121 during communication with the photographic lens 121 and during AF (autofocus), and drive control of an aperture blade. Further, through shutter control, appropriate exposure is performed on the imaging element 123. Image data obtained using the imaging sensor 123 is processed by the image processing circuit 204, and is transmitted to the buffer memory 208. An image processing 209 calculates the amount of movement of the image capture devices 102 for generating a high-accuracy virtual image according to virtual camera viewpoint information, using image data of a plurality of images photographed by the plurality of image capture devices 102 stored in the buffer memory 208, and notifies the image capture device control circuit 203 of the calculated amount of movement. Further, the image processing 209 generates image data according to the virtual camera viewpoint information, the output image format, and the image data format, using image data of a plurality of images photographed by the image capture devices 102 controlled in accordance with the amounts of movement, which is stored in the buffer memory 208, and records the image data onto a recording device 212. In this exemplary embodiment, the process for generating an image from the virtual camera viewpoint is performed using the plane sweep method. However, any other method may be used for generation. The process for generating a virtual viewpoint image using the plane sweep method will be described below.

The LCD monitor 211 and a backlight illumination 210 form the image display device 105. The recording device 212 is, for example, a semiconductor memory card removably inserted into the camera body through the card slot 111, a hard disk drive connected using an external terminal (not illustrated), or the like.

Next, the plane sweep method will be described. In the plane sweep method, first, a virtual focus plane is set as a candidate point of a position (object position) at which an object corresponding to a pixel to be estimated in a virtual viewpoint image is present. The reliability level of the set focus plane is determined using a pixel value corresponding to a point on the set focus plane in each of a plurality of images photographed by the plurality of camera units. The point on the set focus plane corresponds to a pixel of interest. Then, a distance according to a focus plane having a high reliability level is determined as the distance corresponding to the pixel to be estimated in the virtual viewpoint image.

By determining distance information about each pixel on the virtual viewpoint image, it is possible to generate a distance map of a photographing area. Then, the plurality of images photographed by the plurality of camera units are reconfigured in accordance with the distance map, and therefore a virtual viewpoint image can be generated.

Figure 3A:
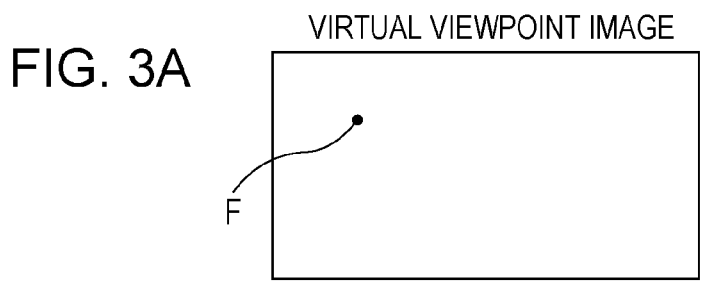
FIGS. 3A to 3C are diagrams illustrating an overview of a process for acquiring a distance map using a camera array.
Figure 3B:
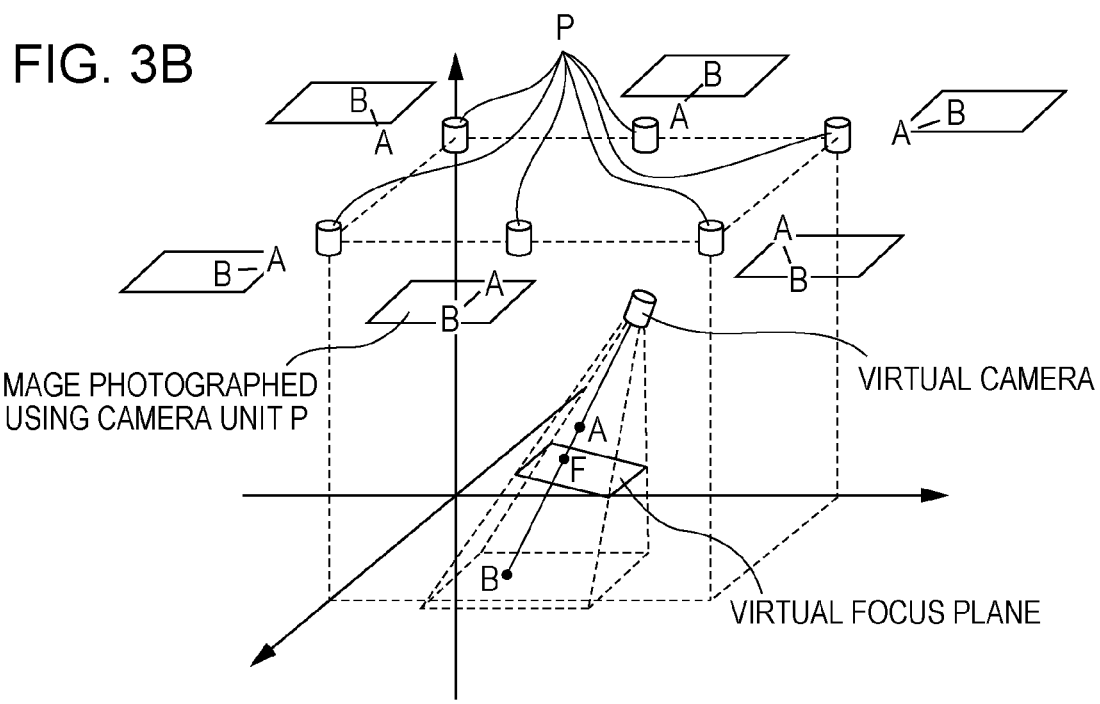

FIG. 3A illustrates a photographed image (virtual viewpoint image) obtained by a virtual camera illustrated in FIG. 3B. FIG. 3B illustrates an overview of a process for estimating a distance of a pixel to be estimated F in FIG. 3A from a virtual camera. The object corresponding to the pixel to be estimated F is present on a straight line connecting the virtual viewpoint position and the position of the pixel to be estimated F in the space. Thus, while the virtual focus plane is moved from a point A to a point B, a pixel value corresponding to the position of a point on the straight line that intersects (candidate point) the virtual focus plane in each of a plurality of images photographed by a plurality of camera units P is specified. In the example of FIG. 3B, all the photographed images of six arranged camera units P include corresponding pixels in the range from the point A to the point B. The reliability level of the set virtual focus plane is determined using the degree of coincidence among the feature values of a plurality of specified pixel values. If the virtual focus plane is correct, the degree of coincidence is high because pixel values specified in the images photographed by the plurality of camera units P are pixel values corresponding to the same object. On the other hand, if the virtual focus plane is not suitable, the degree of coincidence is low because the respective specified pixel values are pixel values corresponding to different objects. A distance according to a focus plane having a high reliability level is determined as the distance corresponding to the pixel to be estimated in the virtual viewpoint image.

Figure 4:
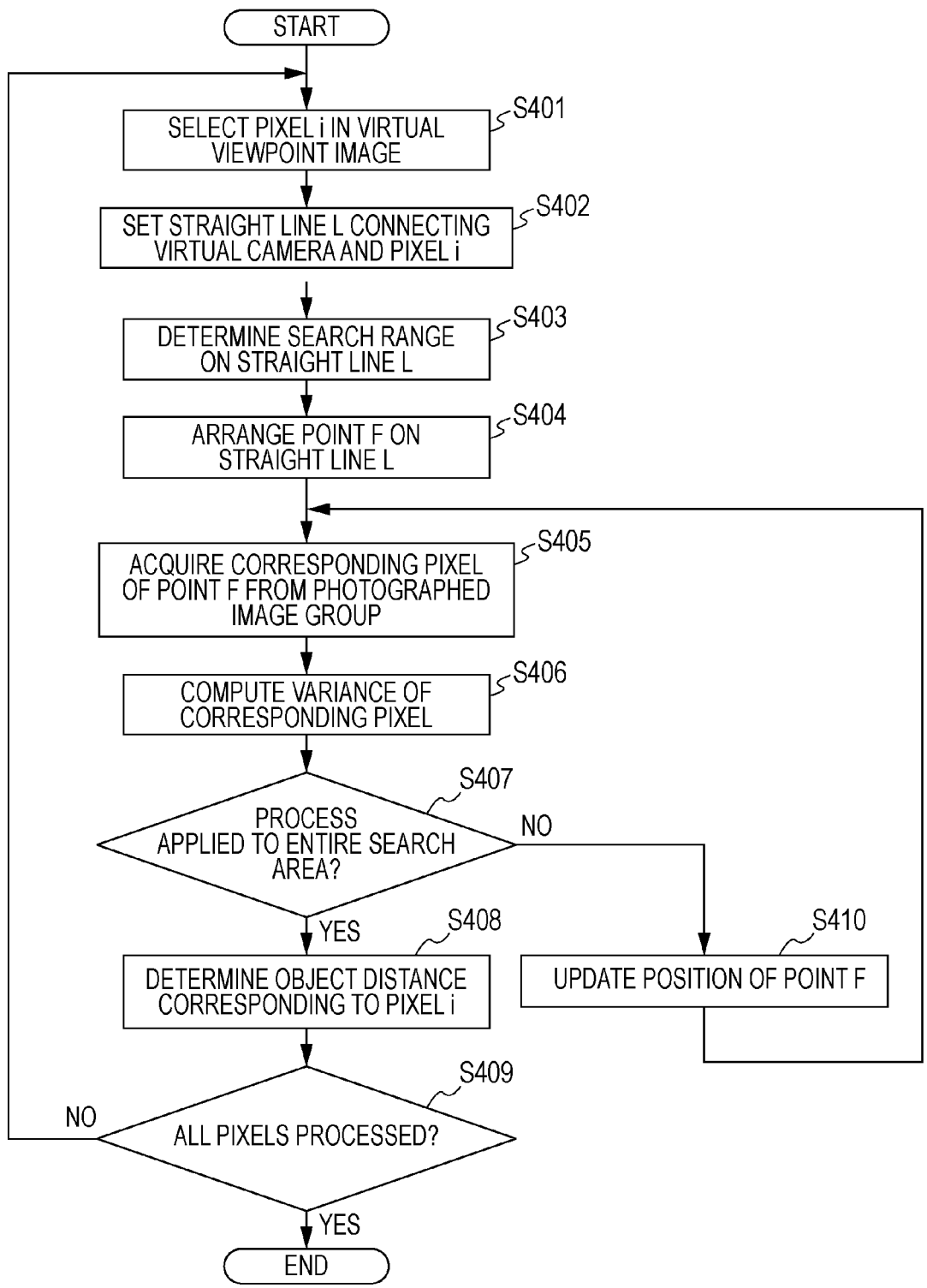
FIG. 4 is a flowchart illustrating a flow of a distance map estimation process.

A flow of the image process using the plane sweep method will be described using FIG. 4. A pixel i included in a virtual viewpoint image is selected (step S401). Then, a direction vector from the virtual camera viewpoint to the pixel i is calculated, and a straight line L including the direction vector is set (step S402). A search range on the straight line L is determined (step S403). A virtual focus plane is set within the search range in sequence from a position close to the virtual camera to infinity, and an object distance is sought. A point F, which represents a provisional object distance, is arranged on the straight line on which the search range is set (step S404). A pixel corresponding to the point F is acquired from a photographed image group (step S405). The provisional object distance means a distance between a virtual focus plane including the point F and the virtual camera. Here, for example, as in FIG. 3B, if the photographic range of the virtual camera is covered using six cameras, one pixel for each of six photographed images, that is, a total of six pixels, is acquired as a pixel corresponding to the point F. The method for calculating a pixel position corresponding to the point F will be described below.

It is determined using the acquired pixel group whether or not an object (photographic object) is present at the positions specified by the point F. The presence of an object can be determined by determining whether or not a certain proportion of pixels or a larger proportion of pixels in the pixel group substantially coincide with each other. In this exemplary embodiment, whether or not pixels substantially coincide with each other is determined using the variance of the feature values of the pixels. Thus, in step S405, variance values of the feature values of the plurality of acquired pixels are calculated and are set as the reliability levels of the object distance for the point F (step S406). The position of the point F is updated within the search range, and the processing of steps S405 and S406 is repeatedly performed (steps S407 and S410).

Then, a point $F_{min}$ having the lowest variance value among the variance values calculated for the respective points within the search range is extracted, and the object distance according to the point $F_{min}$ is employed as the object distance of the pixel i (step S408). The processing of steps S401 to S410 is performed for all the pixels in the virtual viewpoint image (step S409), and a distance map indicating object distance information about the respective pixels in the virtual viewpoint image can be obtained.

Based on the object distance information, a three-dimensional shape of the object can be estimated or a virtual viewpoint image can be generated. Determining a feature value of a virtual viewpoint image using the feature value of the pixel corresponding to the point F_min makes it possible to directly create a virtual viewpoint image without creating a distance map. For example, it is conceivable that an average color of the pixels corresponding to the point $F_{min}$ in the photographed image group is used as the pixel value of the point F in the virtual viewpoint image.

Figure 3C:
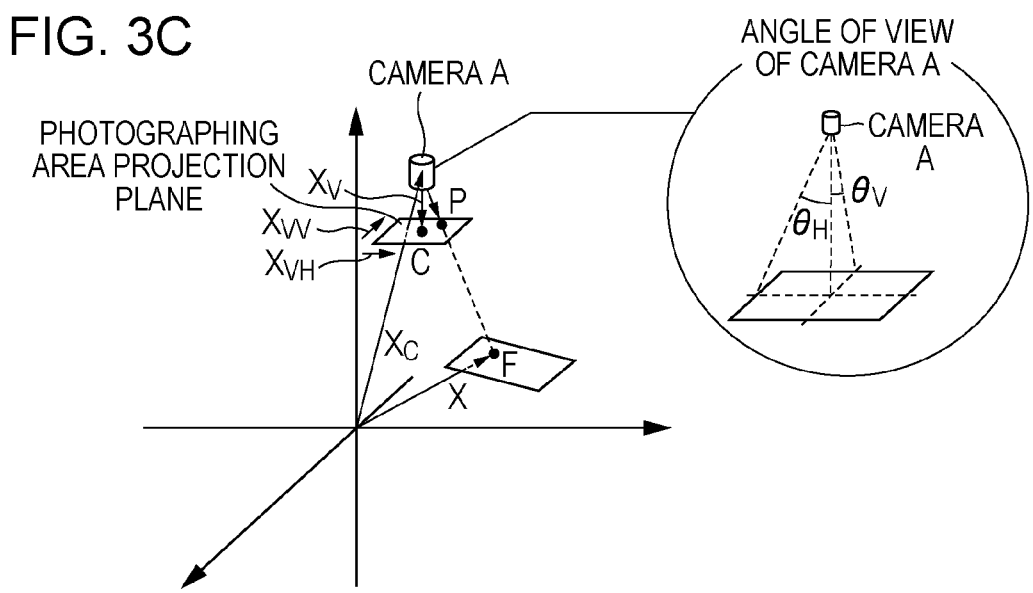

The method for calculating the coordinates corresponding to the point F in a photographed image will be described using FIG. 3C. In the figure, a camera A corresponds to, for example, a camera unit P in FIG. 3B or the virtual camera. A photographing area defined by the camera A represents a quadrangular pyramid space whose vertex is the camera A, horizontal angle of view is $\theta_H$, and vertical angle of view is $\theta_V$. In this space, a plane having a photographing distance of 1 from the camera A is assumed to be a photographing area projection plane.

First, in the coordinate system in the real space is mapped, it is assumed that the position vector of the point F is X, the position vector of the camera A is $X_C$, and the vector from the camera A to the center C of the photographing area projection plane is $X_V$. It is assumed that the upper direction and the right direction of the photographing area projection plane are $X_{VV}$ and $X_{VH}$, respectively. Here, $X_{VV}$ and $X_{VH}$ are assumed to be unit vectors. Further, it is assumed that a point P is at the coordinates on the photographing area projection plane corresponding to the point F. The position vector p of the point P can be represented using the following equation.

$$p = \hat{R}X - \hat{R}X_C \qquad \text{Equation (1)}$$

Here, it is assumed that $$\hat{R} = {}^t(X_{VH}, X_{VV}, X_V) \qquad \text{Equation (2)}$$

where t denotes the transposed matrix. It is assumed that the number of horizontal pixels of the photographed image obtained by this camera is represented by $N_H$, the number of vertical pixels is represented by $N_V$, and the right direction and the down direction are the positive direction of the X component and the positive direction of the Y component, respectively, where the upper left of the image is used as the origin. Then, the coordinates ($p_x$, $p_y$) of the pixel corresponding to the point P in the photographed image can be represented using the following expression:

$$p_x = \frac{1}{2}(N_H - 1) + \frac{1}{2}N_H \frac{p_0}{p_2} \frac{1}{\tan\theta_H} \qquad \text{Equation (3)}$$

-continued $$p_y = \frac{1}{2}(N_V - 1) - \frac{1}{2}N_V \frac{p_0}{p_2} \frac{1}{\tan\theta_V}$$

Here, it is assumed that p=(p₀, p₁, p₂).

The coordinates of the pixels corresponding to the point F in the photographed images of the respective camera units and the virtual camera can be computed using the equations given above.

Figure 9:
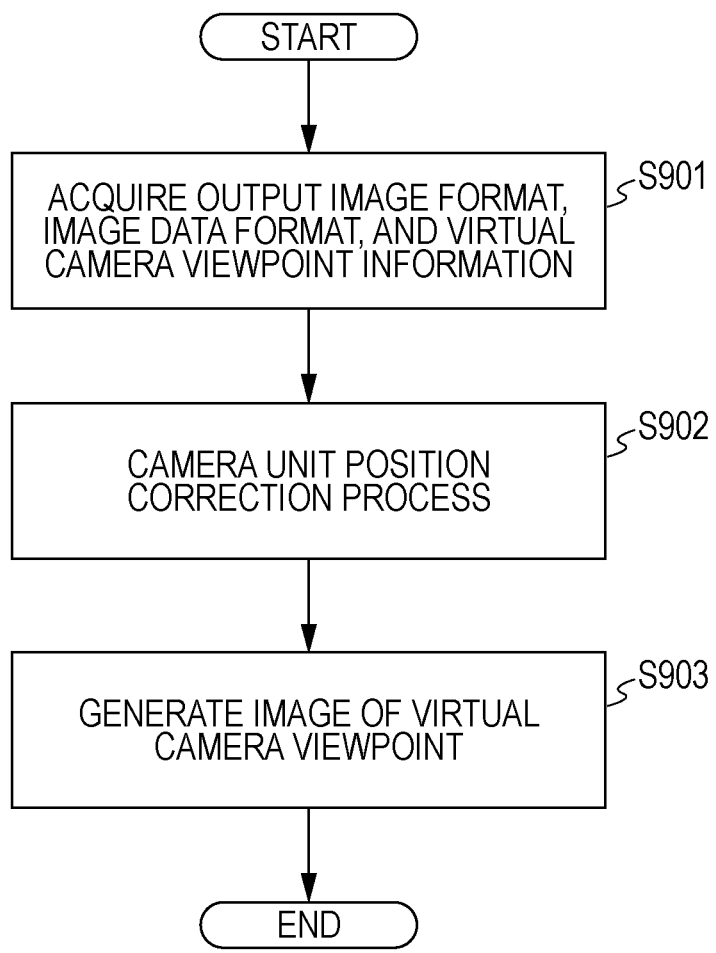
FIG. 9 is a flowchart illustrating a flow of an image process.

Next, a flow of the image process performed by the image processing unit 209 will be described using FIG. 9.

Figure 8:
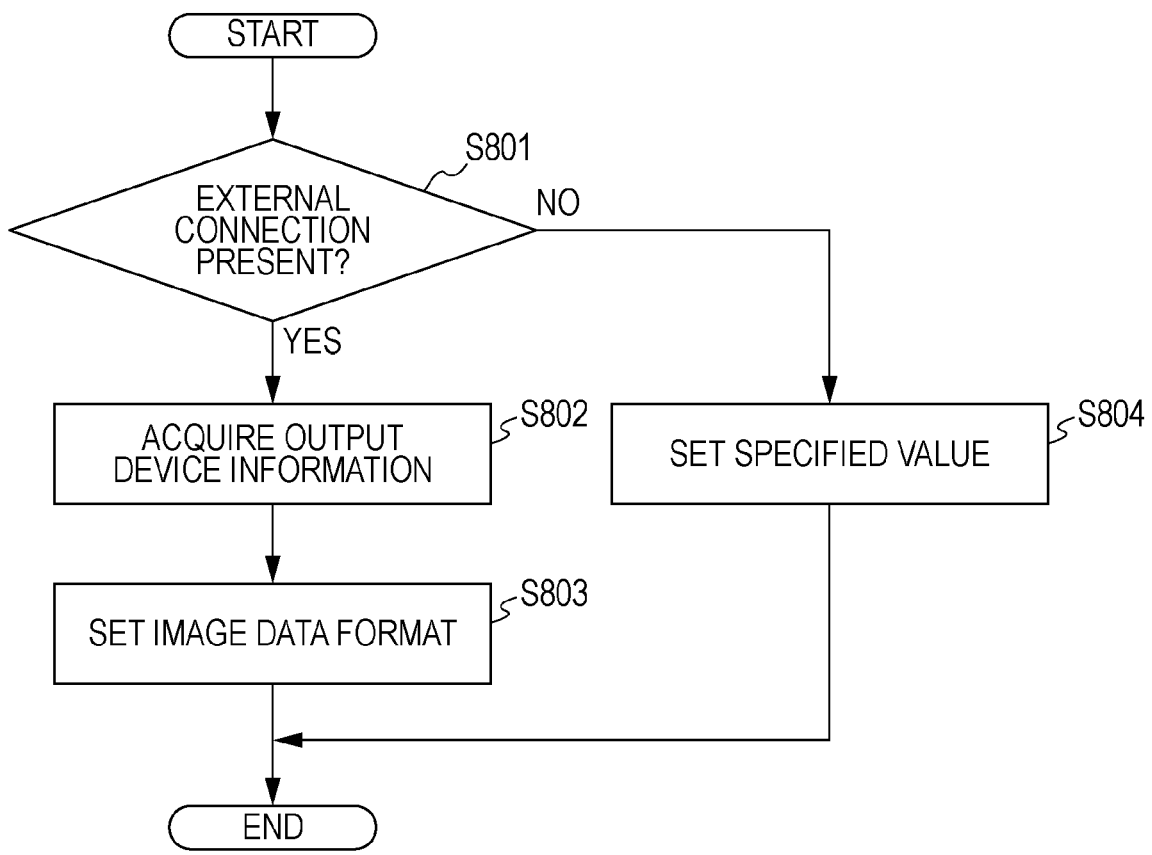
FIG. 8 is a flowchart illustrating a flow of a process for automatically determining an image data format.

First, in accordance with pressing of the switch (SW1) 205, the output image format, the output data format, and virtual camera viewpoint information set by a user through the camera setting menu are acquired (step S901). If "automatic selection" is set as the output data format, the output image data format set by the microcomputer through the process illustrated in FIG. 8 is acquired. A camera position correction process is performed in accordance with the virtual camera viewpoint information, and the camera units are notified of a calculated corrected camera position (step S902).

Then, in accordance with pressing of the switch (SW2) 206, a virtual camera image according to the output image format and the virtual camera viewpoint information is generated using a plurality of images photographed by the plurality of camera units on the basis of the corrected camera positions, and image data according to the output data format is generated (step S903). As illustrated in FIG. 4, the object distance for each pixel in the virtual camera viewpoint image is calculated using the plurality of images, and a pixel value of the virtual viewpoint image is calculated from the values of the pixels corresponding to the object distance in the plurality of images.

FIG. 10A is a flowchart illustrating a flow of the camera unit position correction process performed in step S902. First, output images of the plurality of camera units 101 are obtained at the time when the switch (SW1) 205 is pressed (step S1001). Then, the object distance for each pixel of the image data of the virtual viewpoint image is estimated using the process illustrated in FIG. 4, and an object distance undefined area in which an object distance cannot be uniquely specified is extracted (step S1002). In this exemplary embodiment, the search range is set in a range from the shortest photographing distance of the cameras (for example, 24 cm) to infinity.

Figure 11A:
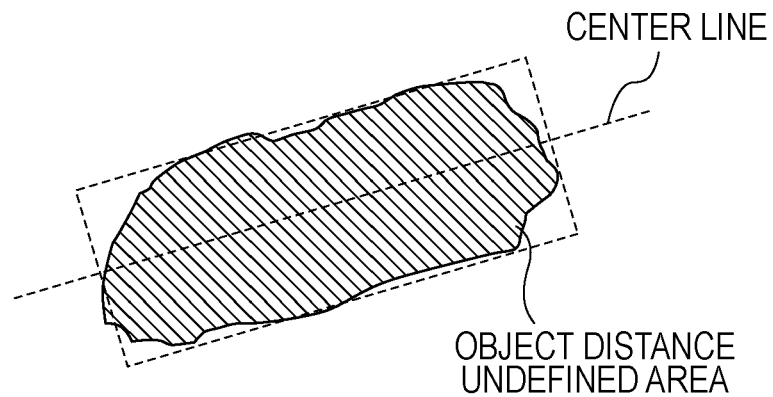
FIGS. 11A and 11B are diagrams illustrating an overview of a camera position after the camera position correction process is performed.

The object distance undefined area is approximated with a rectangle to generate a straight-line object (step S1003), and a center line (FIG. 11A) connecting the midpoints of the short sides of the straight-line object is set (step S1004).

In a predetermined coordinate system, a camera unit to move is selected from the relationship between the coordinate position of an object distance undefined area in a virtual viewpoint image and the coordinate positions of the plurality of camera units. The predetermined coordinate system is, for example, the coordinate system that defines the real space illustrated in FIG. 3. Specifically, a plurality of camera units positioned near the center line of the object distance undefined area, and a camera unit positioned within or near the object distance undefined area are selected. The plurality of camera units positioned near the center line of the object distance undefined area are not caused to move. The amount of movement of the camera unit positioned within or near the object distance undefined area is calculated. Then, the amount of movement of the camera unit selected as the target to move is calculated on the basis of the normal vector of the center line (step S1005).

Figure 11B:
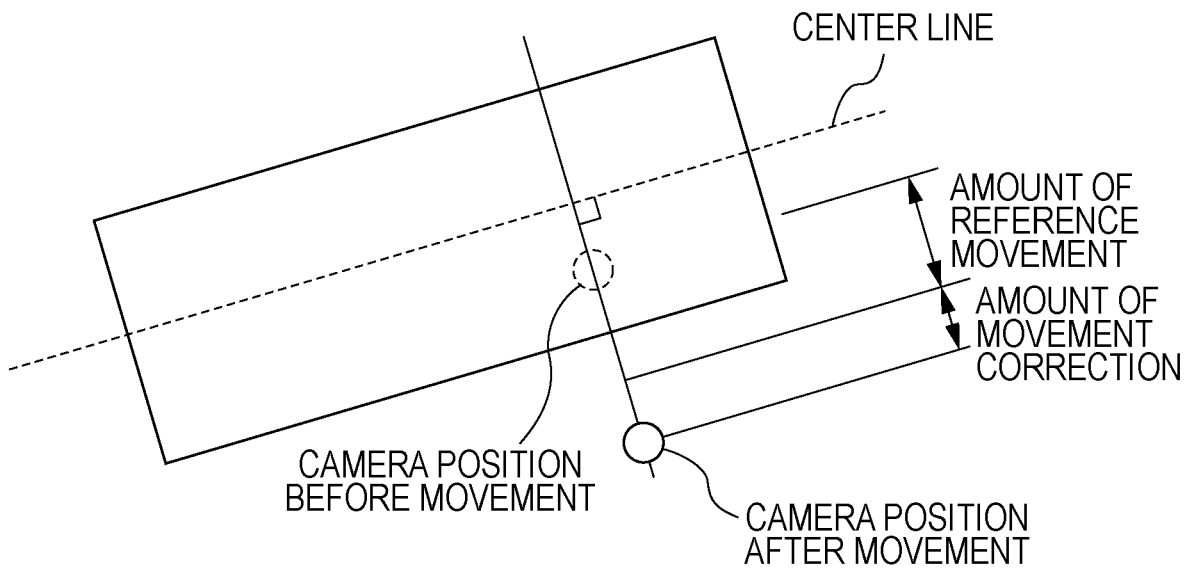

There are two normal vectors to the center line. In this exemplary embodiment, the normal vector farther from the center line is selected. The amount of movement of a camera unit is determined by the angle of view of the photographic lens and the width of the straight-line object (the length of the short sides). In this exemplary embodiment, a camera unit is moved by the sum of an amount of reference movement and an amount of movement correction so that the center of a photographed image can be moved (FIG. 11B). The amount of reference movement is set as, for example, a value equal to a half the width of the straight-line object. The amount of movement is set as, for example, a value obtained by adding the amount of camera shake estimated from the photographic conditions to 5% of the width of the straight-line object.

Finally, the camera unit set as an object to move is notified of the corrected position (step S906). Subsequently, the camera unit notified of the corrected position transmits photographed image data to which the corrected coordinates are added to the buffer memory 208. In this manner, the position of the camera unit can be corrected to avoid the situation in which the object distance cannot be acquired. The method for selecting a normal vector when a camera unit moves is not limited to that described in this exemplary embodiment. For example, a candidate that is considered to have a larger amount of information (for example, a larger number of edges detected, etc.) may be selected from among images of two camera units near the position of the candidate destination to obtain a higher-accuracy distance map.

Next, FIG. 10B is a flowchart illustrating a flow of the object distance estimation process performed in step S1002. First, object distance counter maps corresponding to individual pixels in a photographed image obtained by a virtual camera are provided and are initialized to 0 (step S1011). Then, variance values of the corresponding pixels in respective focus planes are calculated in a method similar to that for respective pixels of the photographed image obtained by the virtual camera as described with reference to FIG. 4 (steps S1012 to S1018). Here, for the positions of the respective camera units, coordinates updated through the process described with reference to FIG. 10A are used.

When the variance values of the corresponding pixels in the entire search range are calculated (step S1019), the number of focus planes for which the variance values are less than a predetermined threshold value is counted, and the count value is reflected in the object distance counters (step S1020). That is, the number of focus planes having a high probability that the object is present is counted. After object distance counters have been set for all the pixels (step S1021), the counter values of the object distance counter maps are compared with a threshold value (step S1022). A pixel for which the counter value is larger than the threshold value, that is, a pixel having a certain number of focus planes or more with a high probability that the object is present, is determined to be an object distance undefined area. As in FIG. 5, in a case where the single-color object X is arranged parallel to the arrangement of a plurality of cameras, the variance values for all the focus planes a, b, and c, which are calculated in step S1019, are smaller than the predetermined threshold value. According to this exemplary embodiment, it can be determined that such a pixel in the virtual viewpoint image is an object distance undefined area.

Through the above process, it can be determined whether or not an object distance can be uniquely defined for each pixel. According to this exemplary embodiment, it is possible to generate a high-accuracy distance map by dynamically correcting the position of a camera unit, thus making it possible to obtain a desired output image. Further, in this method, since the position of camera units can be changed, there is an advantage in that the camera units may have any initial arrangement. Therefore, while a grid arrangement is employed in the overview illustrated in FIGS. 1A to 1D, any other arrangement (for example, a spherical arrangement) may be used.

Exemplary Embodiment 2

In Exemplary Embodiment 1, a method for solving the problem by dynamically changing the position of cameras forming a camera array has been discussed. However, in some cases, the camera position may not necessarily be dynamically changed, such as in a case where an actuator cannot be provided due to the physical constraint on compact digital cameras or the like, such as the limited size of the camera body. Thus, in this exemplary embodiment, a method for solving the problem in a case where the camera position cannot be dynamically changed will be discussed.

Figure 5A:
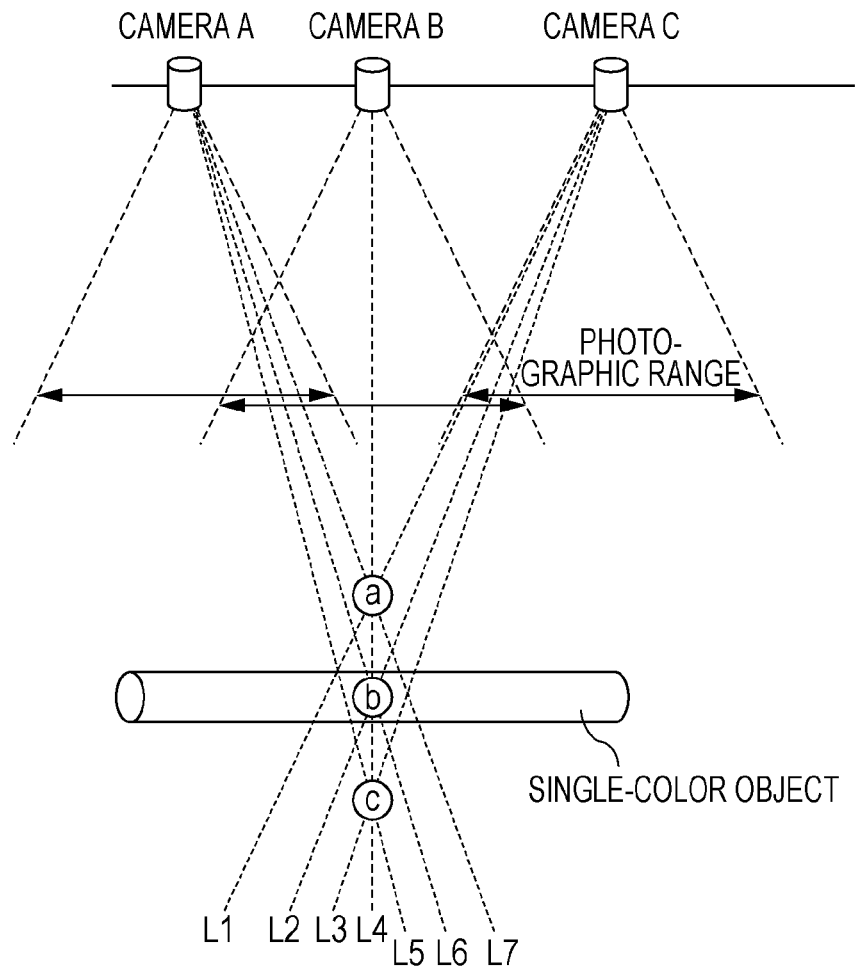
FIGS. 5A to 5C are diagrams depicting difficulties caused when distance information is acquired based on the arrangement of cameras and the relative positions to an object.
Figure 5B:
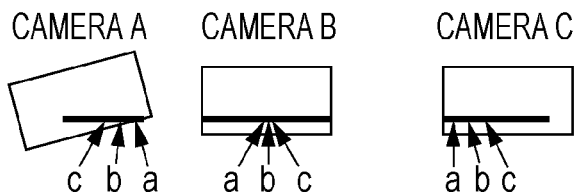
Figure 5C:
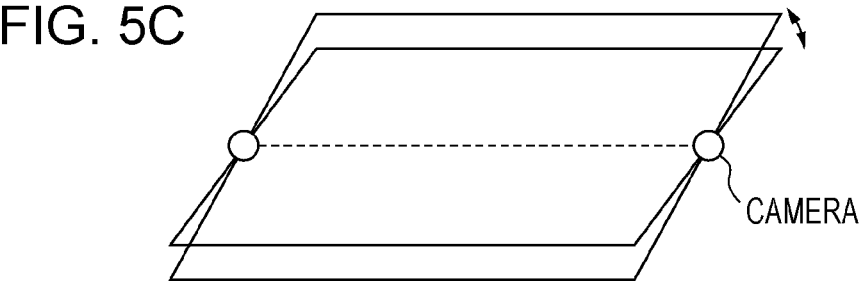

As described using FIG. 5, there is a problem with the presence of an area in which the amount of information does not increase even when another camera is arranged on a straight line passing through two cameras. Thus, an arrangement can be conceived in which any three cameras selected from among all cameras forming a camera array are not in the same straight line.

Figure 12:
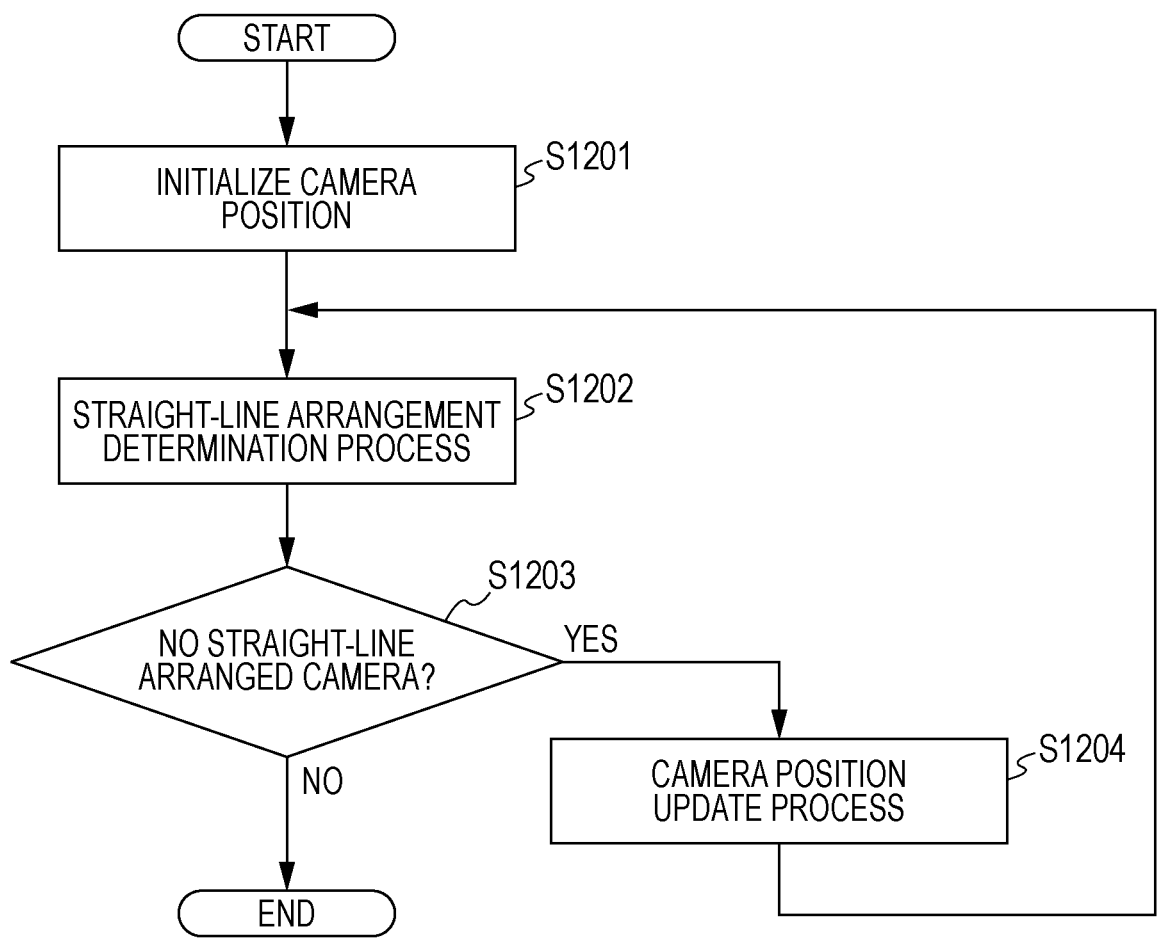
FIG. 12 is a flowchart illustrating a flow of a camera position determination process according to Exemplary Embodiment 2.

FIG. 12 is a flowchart illustrating a flow of a process for determining an arrangement in which three out of all cameras forming a camera array are not in the same straight line. Hereinafter, a state where three cameras are arranged in the same straight line is referred to as a straight-line arrangement.

Figure 13:
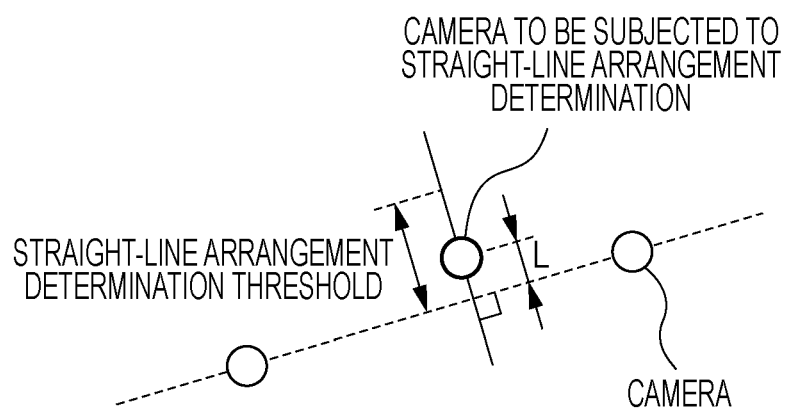
FIG. 13 is a diagram illustrating an overview of a straight-line arrangement determination process for a camera position.

First, the position of the cameras is initialized (step S1201), and straight-line arrangement determination is performed for each camera (step S1202). In the straight-line arrangement determination, the distance L of a camera of interest with respect to a straight line connecting the other two cameras is calculated, and when this distance is smaller than a predetermined distance, it is determined that the camera of interest is arranged in a straight line (FIG. 13). If there is no camera that is determined to be arranged in a straight line, the process ends (step S1203); otherwise, the position of the camera is updated (step S1204). The camera position update process is applied to only a camera that is arranged in a straight line.

Figure 14:
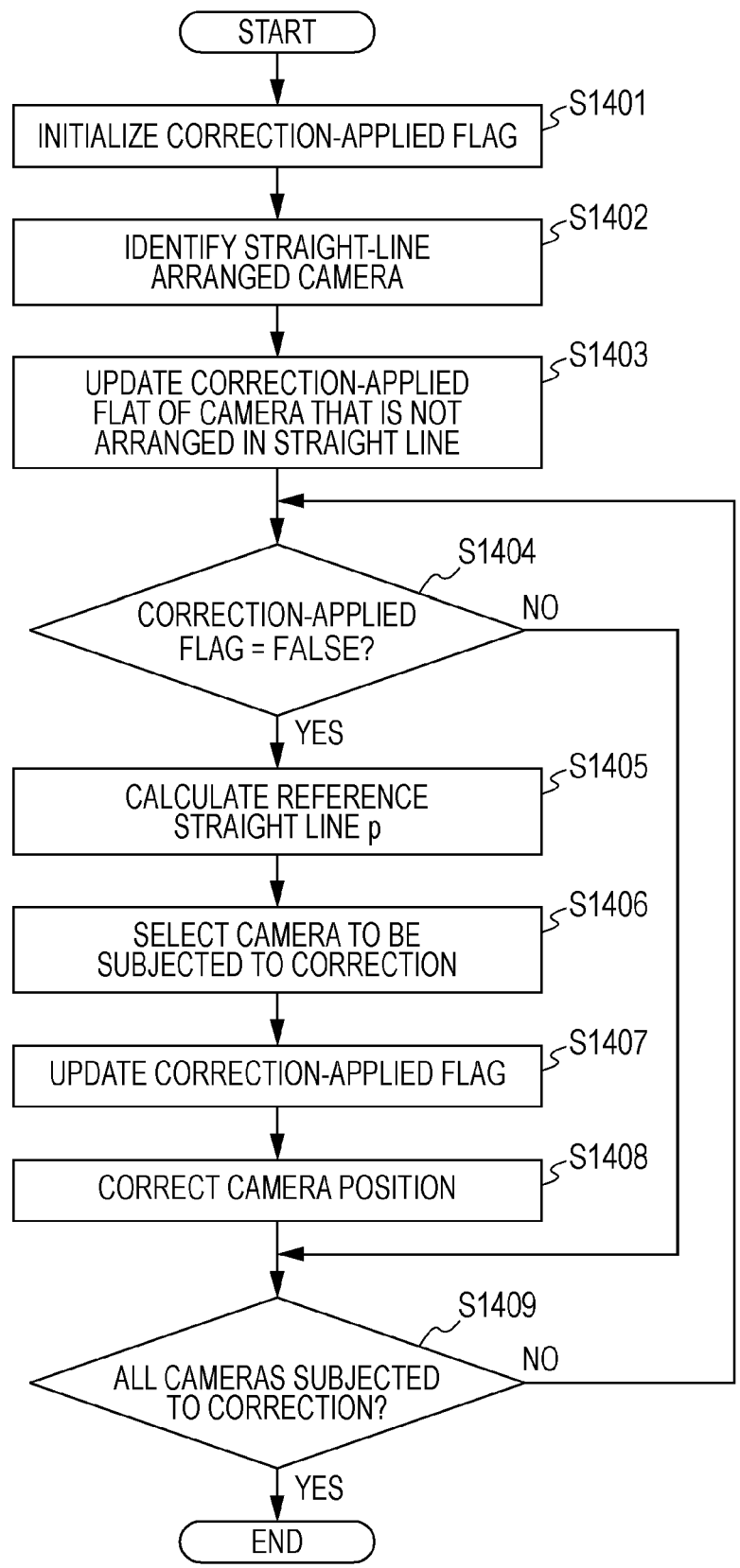
FIG. 14 is a flowchart illustrating a flow of a camera position update process.
Figure 15:
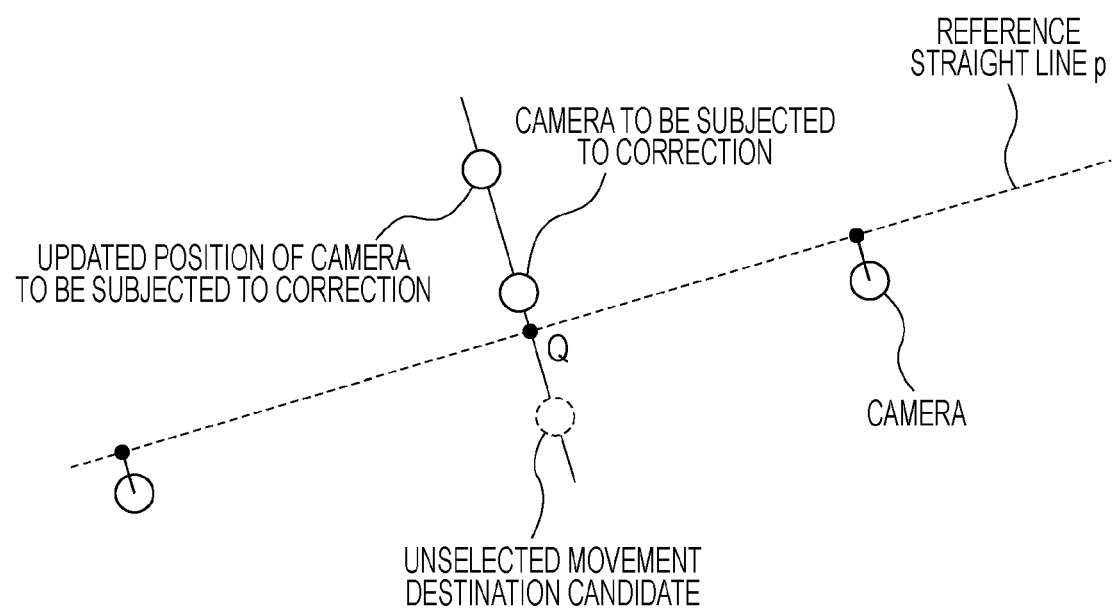
FIG. 15 is a diagram illustrating an overview of a camera position after the camera position update process is performed.

FIG. 14 is a flowchart illustrating a flow of the camera position update process. First, correction-applied flags indicating whether or not a camera position has been corrected are initialized to FALSE for all the cameras (step S1401). Then, it is checked whether or not each camera has been determined to be arranged in a straight line in the straight-line arrangement determination (step S1402). For a camera that is determined not to be arranged in a straight line, the correction-applied flag is set to TRUE (step S1403). Subsequently, the process is executed for each camera. For a camera whose correction-applied flag is set to FALSE, a reference straight line p obtained by approximating the positions of three cameras arranged in a straight line with a straight line is calculated (steps S1404 and S1405). The foot of the perpendicular drawn from each camera position with respect to the calculated reference straight line p is determined, and a camera to be subjected to correction, which corresponds to the center point Q among obtained three points, is selected (step S1406). Specifically, on a straight line connecting the point Q and the position of the camera to be subjected to correction, one of two points spaced a predetermined distance r apart from the position of the camera to be subjected to correction, which is farther from the reference straight line p, is selected, and an updated position is determined (FIG. 15). The distance r differs depending on the interval between cameras forming a camera array. For example, if the camera interval is 1 cm in average, the position is updated in increments of 0.001 mm (0.1%).

After correction-applied flags of three cameras arranged in a straight line are set to TRUE, the position of the camera to be subjected to correction is updated (steps S1407 and S1408). When the correction-applied flags of all the cameras become TRUE, the process ends (step S1409).

The initial arrangement of the cameras in step S1201 may be, for example, a grid arrangement as illustrated in FIGS. 1A to 1D. However, in the first straight-line arrangement determination, all the cameras may be a target to be subjected to the camera position update process, which may not necessarily be efficient. It can also be conceived that the initial positions are randomly arranged. However, in addition to the non-uniform distribution of the cameras in the camera array, there is no guarantee that the number of cameras to be subjected to the camera position update process is reduced. Thus, it can be conceived that an initial position is determined using the blue noise mask. The blue noise mask is a huge (for example, 256×256) dither matrix, and has a characteristic in that with regard to any of numbers included in the matrix, elements having numbers less than or equal to this number are uniformly dispersed. Further, if an identical value exists, elements having the value are arranged at a substantially equal distance. Therefore, it is conceivable that a density is set so as to obtain the number of elements corresponding to the number of cameras forming a camera array and that the positions of elements selected as a result are set as the initial positions of the cameras. The determination of the initial position using the blue noise mask provides advantages of, unlike random numbers, the uniform distribution of cameras and of, unlike a grid arrangement, the less occurrence of straight-line arrangement, thus accelerating the convergence.

With the use of a camera array having a camera arrangement determined using the method described above, even in a case where the position of cameras forming the camera array cannot be dynamically changed, it is possible to generate a high-accuracy distance map and to obtain a desired output image. Further, in the process for determining a camera position, by determining an initial arrangement using the blue noise mask, it is possible to determine an appropriate camera arrangement for a small amount of time.

Exemplary Embodiment 3

In Exemplary Embodiment 2, the method in which none of all cameras forming a camera array is arranged in a straight line has been discussed. However, in a case where a maximum photographing distance is limited, such as in studio photography, all the cameras may not necessarily have a straight-line arrangement. A problem occurs when the cameras included in a camera group having overlapping photographing areas are arranged in a straight line. That is, in a situation where a maximum photographing distance is limited, a local straight-line arrangement may be prevented, and no need exists to optimize all the cameras.

Thus, in this exemplary embodiment, cameras to be subjected to straight-line arrangement determination are limited to a camera group having a photographing area that overlaps the photographing area of the camera of interest. The process flow itself is similar to that illustrated in FIG. 12, and the detailed descriptions thereof are omitted. Performing this process makes it possible to determine an appropriate camera arrangement for a smaller amount of time.

Exemplary Embodiment 4

In addition to a small camera array as illustrated in FIGS. 1A to 1D, a large camera array such as that configured by, for example, arranging a large number of cameras on the ceiling of an event hall is also conceivable. In the case of such a large camera array, there is a problem in that it is difficult in terms of cost to, as in Exemplary Embodiment 1, dynamically change the position of cameras or that it is difficult in terms of installation to, as in Exemplary Embodiment 2 or Exemplary Embodiment 3, arrange cameras irregularly.

Thus, in this exemplary embodiment, a method for preventing a straight-line arrangement in such a situation will be described.

Figure 16A:
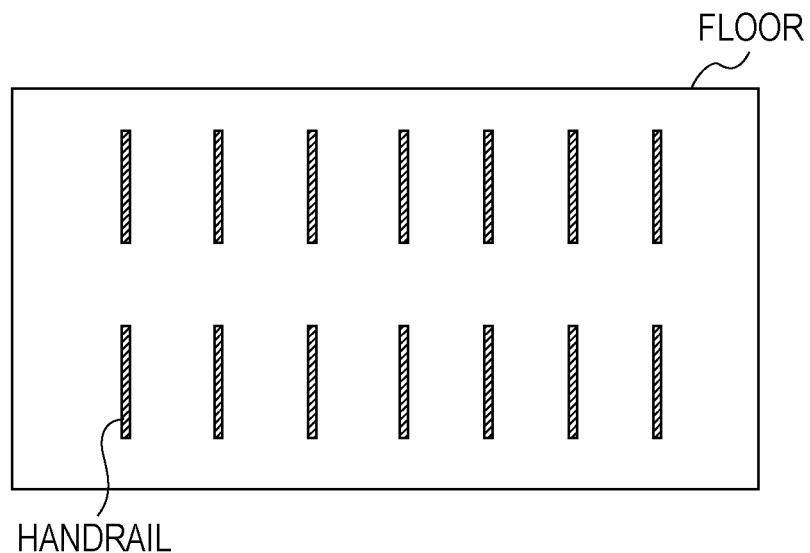
FIGS. 16A and 16B are diagrams illustrating how a camera array is arranged according to Exemplary Embodiment 4.

FIG. 16A illustrates an example of the layout of a hall. Here, the main photographic objects are the floor of the hall, handrails, and the audience (not illustrated). In such a case, as discussed in Exemplary Embodiment 3, since a maximum photographing distance is limited by the distance from the camera installation position to the floor face, it is easy to prevent a straight-line arrangement.

Figure 16B:
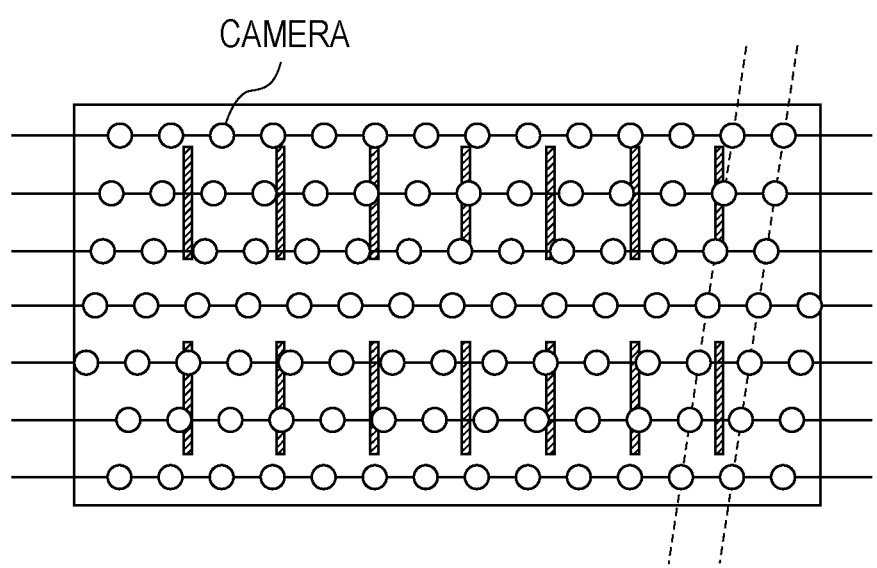

Since the problem as described in Technical Problem occurs mainly in the handrails installed in the hall, it may only be required to prevent the handrails from being arranged in a straight line shape. Thus, it is conceivable to arrange cameras in a manner illustrated in FIG. 16B so as not to be parallel to the handrails. The arrangement in FIGS. 16A and 16B is similar to a grid-like arrangement, but is different in that no cameras are arranged parallel to the handrails. Further, because of a regular arrangement, installation can be easily implemented and installation accuracy can be improved.

The above arrangement makes it possible to correctly acquire the shape of the handrails and to also considerably reduce the installation cost. Furthermore, in the foregoing exemplary embodiments, the above processes (FIGS. 9, 10A, and 10B) are performed by an image processing unit in a digital camera. However, the processes can also be implemented by executing the following process. Software (program) for implementing the functions of the embodiments described above is supplied to a system or an apparatus via a network or various storage media, and a computer (or a CPU, an MPU, or the like) of the system or apparatus reads and executes the program, thereby performing the image processes on image data acquired from a digital camera.

According to the present invention, it is possible to appropriately set the position of an image capture unit and to obtain a desired virtual viewpoint image or distance map.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Application No. PCT/JP2009/068661, filed Oct. 30, 2009, which is hereby incorporated by reference herein in its entirety.

What is claimed is:

1. An apparatus that generates a distance map corresponding to a virtual viewpoint using images captured by a plurality of capture units placed at different positions, the virtual viewpoint being different from positions at which the capture units are placed, the apparatus comprising:
a viewpoint setting unit to set a virtual viewpoint;
a determining unit to determine an undefined area in which an object distance cannot be defined in an image corresponding to the virtual viewpoint, using image data of a plurality of images captured by a plurality of capture units placed at different positions;
a correction setting unit to set an amount of correction of a position of at least one of the capture units according to a shape of the undefined area; and
a generating unit to generate a distance map corresponding to the virtual viewpoint using image data of a plurality of images captured by the plurality of capture units, wherein at least one of the plurality of capture units is placed in a position corrected in accordance with the set amount of correction,
wherein the determining unit sets a plurality of distance candidates for each pixel in the image corresponding to the virtual viewpoint, and determines, as a pixel that composes the undefined area, a pixel, whose number of distance candidates with a high reliability level is larger than a predetermined number, in the image corresponding to the virtual viewpoint,
wherein the determining unit determines a distance candidate as a distance candidate with the high reliability level among the plurality of distance candidates in a case where a variance of feature values of pixels in the plurality of images corresponding to the pixel in the image corresponding to the virtual viewpoint obtained from the distance candidate is less than a predetermined threshold.

2. A method that generates a distance map corresponding to a virtual viewpoint using images captured by a plurality of capture units placed at different positions, the virtual viewpoint being different from positions at which the capture units are placed, the method comprising:
a viewpoint setting step for setting a virtual viewpoint;
a determining step for determining an undefined area in which an object distance cannot be defined in an image corresponding to the virtual viewpoint, using image data of a plurality of images captured by the plurality of capture units;
a correction setting step for setting an amount of correction of a position of at least one of the capture units according to a shape of the undefined area; and
a generating step for generating a distance map corresponding to the virtual viewpoint using image data of a plurality of images captured by the plurality of capture units, wherein at least one of the capture units is placed in a position corrected in accordance with the set amount of correction,
wherein the determining step comprises:
setting a plurality of distance candidates for each pixel in the image corresponding to the virtual viewpoint,
determining a distance candidate as a distance candidate with the high reliability level among the plurality of distance candidates in a case where a variance of feature values of pixels in the plurality of images corresponding to the pixel in the image corresponding to the virtual viewpoint obtained from the distance candidate is less than a predetermined threshold, and determining, as a pixel that composes the undefined area, a pixel, whose number of distance candidates with a high reliability level is larger than a predetermined number, in the image corresponding to the virtual viewpoint.

3. A non-transitory computer-readable storage medium storing an information processing program which when executed, causes a computer to perform the method of claim 2.

4. The method according to claim 2, wherein the shape of the undefined area includes a length of a shorter side of a rectangle obtained by approximating the undefined area.

5. The non-transitory computer-readable storage medium according to claim 3, wherein the shape of the undefined area includes a length of a shorter side of a rectangle obtained by approximating the undefined area.

6. The apparatus according to claim 1, wherein the shape include a length of a shorter side of a rectangle obtained by approximating the undefined area, and wherein the at least one of the plurality of capture units is placed in the position corrected by moving the at least one of the plurality of capture unit in accordance with the set amount of correction toward a direction across a longer side of the rectangle.

7. The apparatus according to claim 6, wherein the position of the at least one of the capturing units is corrected by moving the at least one of the capturing units toward a direction across the longer side of the rectangle.

8. The apparatus according to claim 6, wherein the determining unit sets a plurality of object position candidate points on a straight line that is determined from the virtual viewpoint and from a pixel to be subjected to object distance estimation in an image corresponding to the virtual viewpoint, and determines whether or not an object distance of the pixel can be defined from pixel values of the plurality of images corresponding to the object candidate points.

9. The apparatus according to claim 6, wherein the correction setting unit sets the amount of correction according to a half of the length of the shorter side of the rectangle and an amount of camera shake estimated from photographic conditions of the plurality of capture units.

* * * * *